US008126782B1

(12) United States Patent
Zhu et al.

(10) Patent No.: US 8,126,782 B1
(45) Date of Patent: Feb. 28, 2012

(54) METHOD AND DEVICE FOR LOCATION INTEGRATED ORDERING AND QUEUE PLACEMENT

(75) Inventors: Kevin K. Zhu, Overland Park, KS (US); Jeffrey M. Stone, Overland Park, KS (US); Sei Y. Ng, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1414 days.

(21) Appl. No.: 11/539,538

(22) Filed: Oct. 6, 2006

(51) Int. Cl.
*G06Q 30/00* (2006.01)
(52) U.S. Cl. .................. 705/26.25; 705/22; 705/7.15
(58) Field of Classification Search .............. 705/26, 705/27, 26.1, 26.25, 22, 7.15; 379/266.06
See application file for complete search history.

(56) References Cited

U.S. PATENT DOCUMENTS

| | | | | |
|---|---|---|---|---|
| 6,912,398 | B1 * | 6/2005 | Domnitz ..................... | 455/461 |
| 7,330,112 | B1 * | 2/2008 | Emigh et al. ............. | 340/539.13 |
| 7,450,003 | B2 * | 11/2008 | Weber et al. .............. | 340/539.2 |
| 7,751,971 | B2 * | 7/2010 | Chang et al. ............... | 701/207 |
| 2002/0038259 | A1 * | 3/2002 | Bergman et al. .............. | 705/26 |
| 2004/0093281 | A1 * | 5/2004 | Silverstein et al. ............. | 705/26 |
| 2004/0203903 | A1 * | 10/2004 | Wilson et al. ............. | 455/456.1 |
| 2005/0245271 | A1 * | 11/2005 | Vesuna ...................... | 455/456.1 |
| 2006/0010037 | A1 * | 1/2006 | Angert et al. ................. | 705/15 |
| 2006/0052112 | A1 * | 3/2006 | Baussi et al. .............. | 455/456.1 |
| 2006/0180647 | A1 * | 8/2006 | Hansen ......................... | 235/375 |
| 2006/0256008 | A1 * | 11/2006 | Rosenberg .................... | 342/367 |
| 2007/0162350 | A1 * | 7/2007 | Friedman ...................... | 705/26 |
| 2007/0204218 | A1 * | 8/2007 | Weber et al. .................. | 715/530 |
| 2007/0205278 | A1 * | 9/2007 | Lovett ......................... | 235/383 |
| 2007/0264968 | A1 * | 11/2007 | Frank et al. ................ | 455/404.2 |
| 2007/0281690 | A1 * | 12/2007 | Altman et al. ............. | 455/435.1 |
| 2007/0282621 | A1 * | 12/2007 | Altman et al. .................... | 705/1 |
| 2008/0032719 | A1 * | 2/2008 | Rosenberg .................... | 455/466 |
| 2008/0042840 | A1 * | 2/2008 | Christopher ............... | 340/572.1 |
| 2008/0171559 | A1 * | 7/2008 | Frank et al. ................ | 455/456.5 |

OTHER PUBLICATIONS

BusinessWire, "Trihealth of Ohio selects emergisoft as emergency department information system of choice for all campuses", 3 pages, dated Oct. 24, 2005.*
Pembroke Observer, Doctors say wait-time website won't help, 2 pages, Dated Oct. 25, 2005.*
Davidson etal, "S.L. airport wait drops", Deseret Newsd, 3 pages, dated Oct. 24, 2004.*
Wyman, Scott, "Travelers can now check web for security wait times at South Florida airports", Knight Ridder Tribune Business News, 2 pages, dated Sep. 9, 2004.*

* cited by examiner

*Primary Examiner* — Mark Fadok

(57) ABSTRACT

Disclosed herein is a system and method for performing automated location integrated ordering of products and services at an event. This may be accomplished through placing product orders to one or more vendors using a portable electronic device, wherein upon placing an order, event-specific location information stored on the portable electronic device may be sent along with the order. Upon fulfilling the order, the products may be delivered to the event-specific location information. In addition to performing product ordering, the portable electronic device may also be used to remotely sign up for or check the status of event-specific services or activities. Also, the portable electronic device may be used to locate event services, activities, or attendees and provide a map or directions from the event-specific location to the event service, activity, or attendee.

20 Claims, 5 Drawing Sheets

| Event | |
|---|---|
| Vendors | 502 |
| Services | |
| Raffles | 504 |
| ⋮ | |

Fig. 5

| Vendor Category |
|---|
| Food |
| Apparel |
| Souvenirs |
| ⋮ |

Fig. 6

| Name | Category Type |
|---|---|
| Vendor 1 | Pizza |
| Vendor 2 | Burgers |
| Vendor 3 | Deli |
| ⋮ | ⋮ |

Fig. 7

| Vendor 2 | |
|---|---|
| Qty. | Item Description |
| 2 | Combo 1 (1 drink, 1 burger) |
| — | Hamburger |
| 2 | Hot Dog |
| ⋮ | ⋮ |

Fig. 8

| Hot Dog Options | |
|---|---|
| Qty. | Option Description |
| X | Ketchup |
| — | Mustard |
| X | Relish |
| ⋮ | ⋮ |

Fig. 9

| Hot Dog Options | |
|---|---|
| Qty. | Option Description |
| ⋮ | ⋮ |
| 1 | Apply to Quantity |
| — | Apply to All |
| More Options | Done |

| Vendor 2 | |
|---|---|
| Qty. | Item Description |
| ⋮ | ⋮ |
| — | Fries |
| — | Salad |
| Check-Out | |

Fig. 12

| Vendor 2 | | |
|---|---|---|
| Qty. | Item Description | Price $ |
| 2 | Combo 1 | 6.99 |
| 2 | Hot Dog | 3.99 |
| | Subtotal | 21.96 |
| | Tax | 1.81 |

Fig. 13

| Hot Dog Options | | |
|---|---|---|
| Qty. | Option Description | |
| 1 | Ketchup | |
| | Relish | |
| 1 | Plain | |
| 2 | Total | Done |

Fig. 14

| Vendor 2 | | |
|---|---|---|
| Qty. | Item Description | Price $ |
| | Subtotal | 21.96 |
| | Tax | 1.81 |
| | Total | 23.77 |
| Pay Cash | Pay Credit | |

Fig. 15

| Vendor 2 – Order Complete | | |
|---|---|---|
| Qty. | Item Description | Price $ |
| 2 | Combo 1 | 6.99 |
| 2 | Hot Dog | 3.99 |
| | Total | 23.77 |
| Estimated Delivery | | 15 Min. |

METHOD AND DEVICE FOR LOCATION INTEGRATED ORDERING AND QUEUE PLACEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When attending a public event, people may buy various concessions, souvenirs, and services. Typically, in order to obtain a specific order of any of the wares sold at the event, a customer would need to stand in line, order their desired products, and wait for their order to be fulfilled. Depending on the size of the event, this process may take as long as fifteen to twenty minutes or more, during which time the customer may miss desirable or important portions of the event. With the disadvantages of this process of obtaining specific product orders firmly in the minds of each customer, many potential sales may be lost due to a customer not wanting to miss any of the event, not wanting to wait in line for extended periods of time, or both.

As an alternative to waiting in line, some events have portable vendors. The portable vendors may travel throughout the event and sell a particular product or a set of products, such as a portable vendor selling pizza slices or another portable vendor selling hamburgers and hot dogs. In the event of a portable vendor passing a customer's location, the customer may place product orders locally without having to wait in line. Using a portable vendor, customers may not place specific orders for food, but rather must order a product that the portable vendor is carrying.

At some events, such as at a restaurant or club, a waiter may attend to a customer at the customer's location. The waiter may take specific product orders from a customer and deliver them to the customer's location. While waiters may be viable at small events, they are not cost effective at larger events such as sporting events. At the smaller events, using a waiter may result in a customer taking up event space for longer periods of time if the waiter is not available when the customer is ready to place an order than if an order was immediately taken once the customer was ready.

SUMMARY

Disclosed herein is a portable electronic device for placing orders for products, services, or activities at an event. The portable electronic device comprises a communication unit configured to communicate with one or more event units to obtain event-specific location information, to obtain vendor ordering information, and to place orders to one or more vendors. The portable electronic device also comprises a memory configured to store an ordering application that processes the event-specific location information and the vendor ordering information. The portable electronic device also comprises a processor configured to execute the ordering application to place an order that includes the event-specific location information to one or more of the vendors using the communication unit.

Also disclosed herein is a method for placing an order for products, services, or activities at an event. The method comprises receiving event-specific location information and vendor ordering information, placing the order to one or more vendors using the event-specific location information and the vendor ordering information, and receiving a result of the order at the event-specific location.

Further disclosed herein is an information carrier medium containing instructions that, when placed in operable relation to a computing device, cause the computing device to request event-specific location information and vendor ordering information, and to execute an ordering application in accordance with the vendor ordering information to place an order for products, services, or activities to one or more vendors at an event with the ordering application. The order includes the event-specific location information.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIGS. 5-15 show illustrative screen shots of a location integrated ordering graphical user interface.

DETAILED DESCRIPTION

Figure 1:
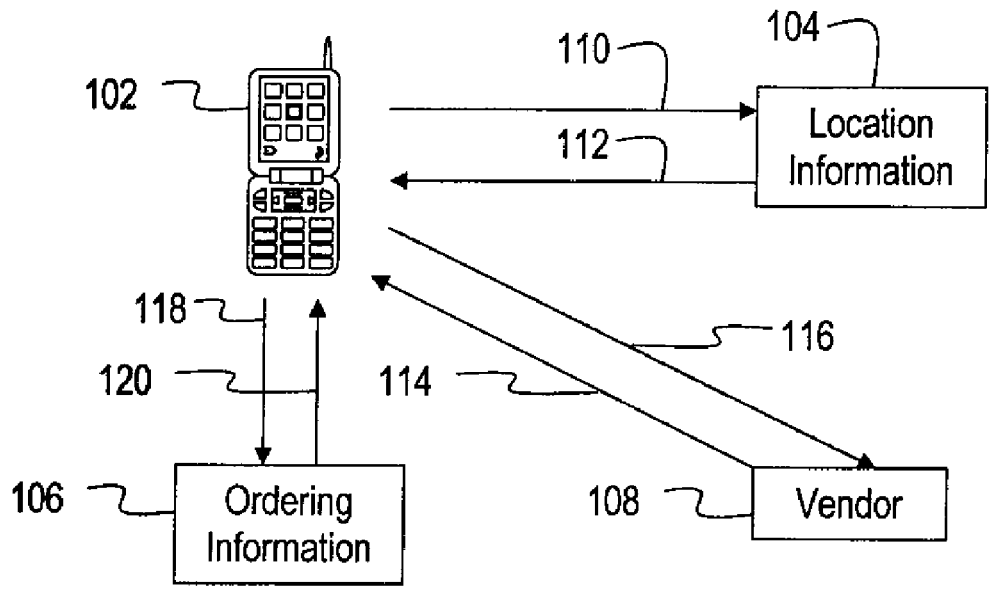
FIG. 1 shows an illustrative location integrated ordering system.

Disclosed herein are systems and methods for performing automated location-integrated ordering of products and services at an event. A customer may purchase a ticket to an event using any conventional ordering process or using a portable electronic device, such as a cell phone, and in the same or a related transaction an e-ticket or another indicator of event-specific location information may be delivered to a portable electronic device. In one embodiment, the related transaction may be using the portable electronic device to browse a particular web-site where an e-ticket or another indicator of event-specific location information may be downloaded. Using the e-ticket or event-specific location information stored in the portable electronic device, a customer may place orders to one or more vendors. When the customer places an order, the event-specific location information stored on the portable electronic device may be sent along with the order. The vendor is then able to fill the order and deliver it to the event-specific location. In this way, vendors are assured of easy and accurate product ordering. Further, customers are able to place specific product orders without missing any of the event or having to wait in line. In an alternative, the event-specific location information may be obtained locally at the event by reading a radio frequency identification tag, or any other indicator of the event-specific location. Obtaining the event-specific location information locally may be particularly useful at non-ticketed events such as at a restaurant or club.

In addition to performing product ordering, the portable electronic device may also be used to remotely sign up for or check the status of event-specific services or activities. Also, the portable electronic device may be used to locate event services, activities, or attendees and provide a map or directions from the event-specific location to the event service, activity, or attendee. By signing up for event queues or checking the status of event services in conjunction with service mapping, a customer may quickly locate and spend less time in line for services or activities that require the customer to leave their seat at an event. In this way the customer is less likely to miss any desirable or important portions of the event.

It should be understood at the outset that although an illustrative embodiments of the present disclosure are described herein, the present system may be implemented using any number of techniques, whether currently known or in existence. The present disclosure should in no way be limited to the illustrative implementations, drawings, and techniques described herein, but may be modified within the scope of the appended claims along with their full scope of equivalents.

In a first proposed method for ordering products from a vendor at an event without missing any portions of the event or having to wait in long lines, a customer may order products for delivery to an event-specific location by placing a call to a vendor using a cellular phone or any other portable telecommunication device. Each customer at the event may receive a list of phone numbers for each vendor and/or a catalog of menus for all of the vendors at the event that may be referenced when contacting a vendor and placing an order. Upon receiving the call, the vendor may receive the order, an event-specific location for delivery such as a row and seat number, and an indication of the payment method, for example, cash or credit. If the customer wishes to pay using a credit card, then the vendor may request the credit card number and any other appropriate information in order to verify the transaction. Upon the order being fulfilled, the vendor may then deliver the products to the event-specific location indicated by the customer. The delivery person may receive payment for cash orders or additional verification of payment with credit card orders such as through a signature or viewing an ID.

While the above method of ordering does solve the problem of having to wait in line and miss portions of the event, there is added expense to the vendor in needing to publish vendor directory lists or catalogs. Further, there is added complexity for the order taker at the vendor through receiving orders over the phone and potentially by walk-up customers as well. Still further, there may not be a sufficient number of order takers at each vendor, which may lead to lost sales due to customers not being able to get a call through to a desired vendor and place their order. Alternatively, customers may be queued on hold; however, this may be a long wait at large events or with popular vendors. The process of waiting on hold may be frustrating for the customer and may distract from the event. As a further alternative, customers may be queued for call-back such that the next available order taker may contact the customer, however, a customers phone ringing in the middle of the event may be distracting to them and any neighboring attendees.

In a second proposed method for ordering products from a vendor at an event, an automated order taking process is provided through an interactive voice response (IVR) system, or any other similar voice prompting system (i.e., press 1 to order a hamburger). Using an IVR system a customer may follow a series of voice prompts in order to navigate their way to placing an order for all of the products they desire. After completing their order, the customer may be prompted to enter in a credit card number along with other verification information or to press a particular key or series of keys on their phone if they want to pay with cash. The customer may also be prompted to enter in their location information such as a seat and row number. Similar to the process described above, upon the order being fulfilled it may be delivered to the customer. While an IVR system may be able to handle multiple calls simultaneously, there is still a need to publish vendor directory lists or catalogs. Further, the process of traversing multiple voice menus to place an order with an IVR system may be frustrating, lengthy, and confusing for the customer. This may be especially true for customized orders such as food orders with specific instructions (i.e., an order for a hamburger with no onions or tomatoes and ketchup on the side).

In the above two proposed methods, the location information may be improperly expressed by the customer or improperly interpreted by the vendor. Further, while a customer may readily be able to see a seat number where they are located, they may not remember or have easy access to determining their row and/or section number. Currently, the customer may determine their row number by looking on an entrance ticket, moving to the end of the row to read the row number, or inquiring from neighboring attendants to the event. The desired information may not be readily interpreted by the customer from the entrance ticket or the entrance ticket may have been misplaced or discarded, and the other two options are disruptive for the customer and their neighboring attendants and may distract from the event. For these reasons, various preferred systems and methods for ordering products and services from event vendors are now described.

In a first preferred embodiment, an automated order taking process may be accomplished through executing an ordering application resident on a customer's cell phone, a personal digital assistant (PDA), or any other portable electronic device (PED) 102. With reference to FIG. 1, a PED 102 may make a request 110 for event-specific location information from a location information unit 104. For example, the location information unit 104 may be any of event admissions, a website, etc. as described in more detail below. The location information unit 104 may reply 112 to the PED 102 with an electronic indication of the event-specific location for a particular customer or group of customers. The event-specific location may be expressed as a row and seat number, a table number, or any other event-specific location identifier. The electronic indication of the event-specific location may be stored in a memory resident on the PED 102. The PED 102 may also make a request 118 for ordering information of one or more of the vendors at the event from an ordering information unit 106. Similar to the location information unit 104, the ordering information unit 106 may be any of event admissions, a website, etc. as described in more detail below. The ordering information unit 106 may reply 120 to the PED 102 with the vendor specific ordering information for the one or more vendors. The vendor specific ordering information may be any of a menu, images, text, an executable program, or any other ordering information as described in more detail below. The vendor specific ordering information may similarly be stored in a memory resident on the PED 102. The PED 102 may execute the ordering application in accordance with the vendor specific ordering information to place an order 116 to a vendor 108. The vendor 108 may be any of a concession stand or an event-specific activity or service, for example. In placing the order 116, the PED 102 may communicate at least the event-specific location information stored in the memory on the PED 102. The vendor 108 may fulfill the order and deliver 114 an indication of the order to the event-specific location information given in the order. For example, the vendor 108 may reply to the order with a receipt of the order. Further, any products or concessions ordered may be delivered to the event-specific location by the vendor 108.

Note that in some embodiments, the vendor 108 may provide event-specific services or activities wherein the PED 102 may execute the ordering application in accordance with the vendor specific ordering information to sign up for or check the status of various event activities or services. Further note that the event may include any of a concert, sporting event, theatrical or movie presentation, restaurant, amusement park, or any other venue where a customer may want to order products for delivery to an event-specific location or sign up for or check the status of various event activities or services.

Figure 2:
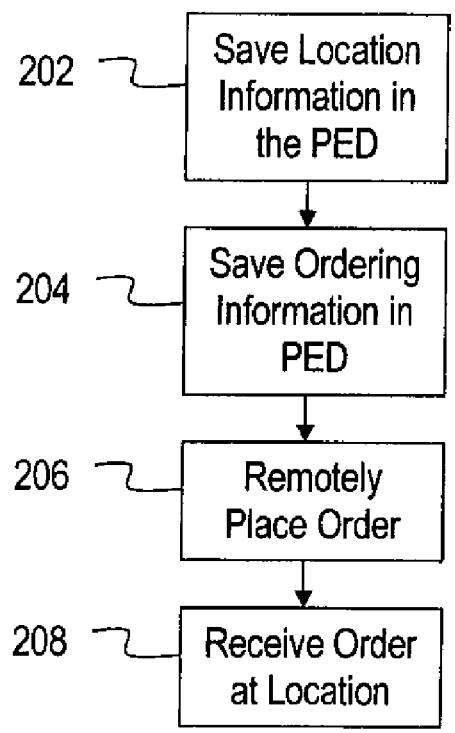
FIG. 2 shows an illustrative location integrated ordering process.

A process for ordering products from a vendor using the system of FIG. 1 is shown in FIG. 2. In block 202, the event-specific location information is saved on the PED 102. As noted above, the event-specific location may be expressed as a row and seat number, a table number, or any other event-specific location identifier. In block 204, the ordering information for one or more vendors is also saved on the PED 102. The ordering information may include any of menus, text, images, or any other visual aids for placing orders for products and/or services. In block 206, an order is remotely placed from the event-specific location to one of the vendors using the ordering information and specifying the event-specific location. In block 208, the vendor delivers the products ordered to the event-specific location sent in the order. For example, a customer may use their PED 102 to place a food order with a vendor, where the vendor may deliver the food to the event-specific location.

Figure 3:
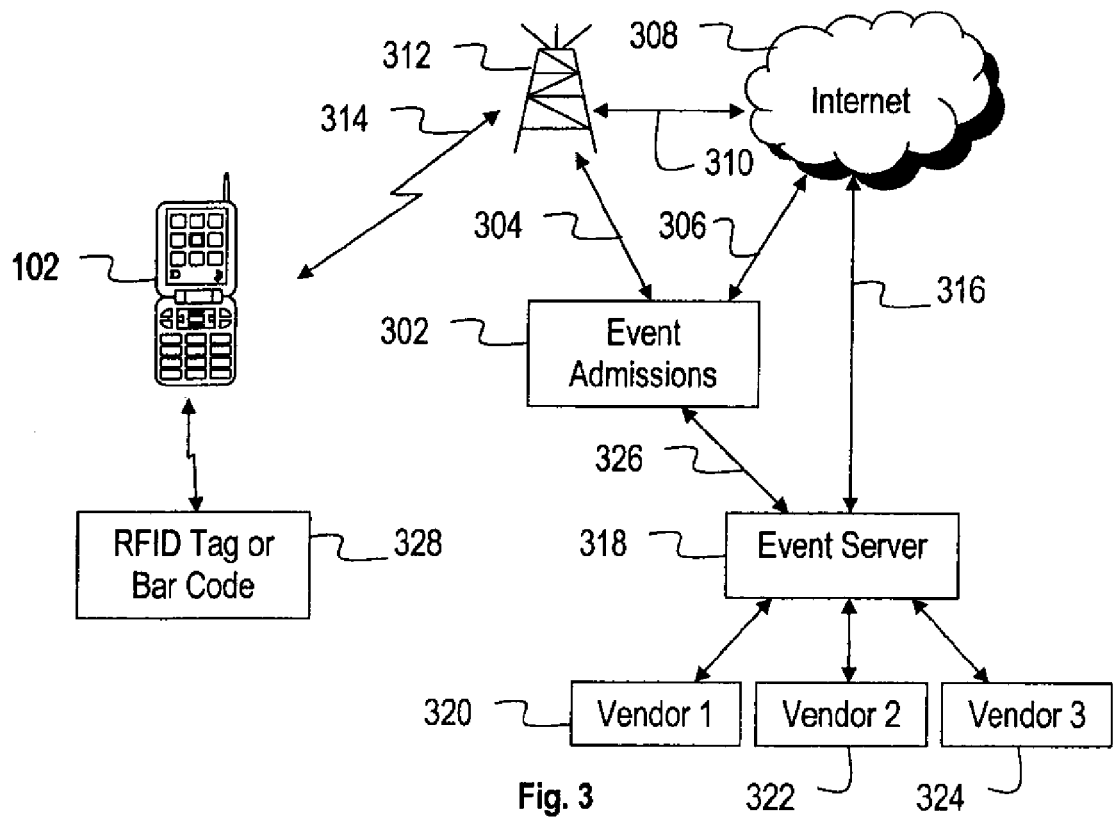
FIG. 3 shows an illustrative location integrated ordering system.

FIG. 3 shows an illustrative implementation of the system of FIG. 1. The interaction between the PED 102 and the location information unit 104 may be accomplished in a number of ways. Referring to the illustrative implementation of FIG. 3, a customer may order admission to an event through calling event admissions 302 or visiting a website supported by the same. In the example of FIG. 3 a phone call may be routed to the event admission 302 through communication medium 304, such as the plain old telephone system (POTS). Further, as shown in FIG. 3 event admissions 302 may connect to the internet 308 or other data network through connection 306. Event admissions 302 may run a web server or other similar device to support a website for accepting orders for admission to an event venue. Note that the PED 102 itself or some other device such as a telephone or personal computer may be used to place the admissions order 110, wherein upon completion of the admissions order, an e-ticket may be directly delivered 112 to the PED 102.

By comparison with FIG. 1, the PED 102 may place the admissions order through communication with the location information unit 104 such as an event admissions website, an event admissions phone system, or an event admissions ordering application executed on the PED 102, for example. A customer may request 110 that an e-ticket should be delivered to a specified PED 102 in reply 112 to the successful completion of the order. In FIG. 3, this delivery may be accomplished by event admissions 302 sending the e-ticket to the internet 308 through connection 306 to a cellular or other wireless communications network 312 through connection 310. The cellular network 312 may then wirelessly transmit the e-ticket to be uploaded onto the PED 102 over any appropriate wireless communication medium 314 using communication protocols known to those skilled in the art.

The e-ticket may include location information such as a seat and row number, a table number, or any other event-specific location information. The PED 102 may be identified through a phone number, IP address, device number, an instant messenger ID, an e-mail address or any other unique device identification that may be used to deliver the e-ticket. The delivery of the e-ticket may also take place by having the PED 102 visit a specific web site, such as the one supported by event admissions 302, and downloading the e-ticket. The examples above were described with an e-ticket being uploaded or downloaded to a PED 102, wherein the e-ticket specifies event-specific location information. Note that as an alternative in the examples described above, the event-specific location information itself may be delivered to the PED 102 apart from an e-ticket.

In an alternative embodiment, the PED 102 may gather the event-specific location information locally at the event. For example, a radio frequency identification (RFID) tag or any other near field communications device, or a bar code 328 may be at each event-specific location in the event venue. In some circumstances, the RFID tag or bar code 328 may be placed on the back of a seat immediately in front of the customer, where it can be easily seen and accessed. The RFID tag or bar code 328 may act as the location information unit 104 and may be scanned 110 by the PED 102 in order for the PED 102 to read 112 the event-specific location information. Similarly, a camera integrated on the PED 102 may be used to capture an image of the seat number or other identifying mark that may be interpreted by the PED 102 to determine the event-specific location information.

The interaction between the PED 102 and each of the ordering information unit 106 and the vendor 108 may also be accomplished in a number of ways. For example, an ordering application may be resident on the PED 102 that may be used to obtain and organize product data specific to each vendor at an event. Similar to the e-ticket, upon completing an admissions order to an event, the vendor and product information for that event may be downloaded or uploaded to be stored on the PED 102. Alternatively, the vendor and product information may be stored locally at the event-specific location in association with the RFID tag 328. The PED 102 may read the RFID tag 328 to obtain and store the vendor and product information for the event along with the event-specific location information. In a further alternative, the RFID tag or bar code 328 may be read by the PED 102 wherein an event website may be identified. The event website may be visited by executing a web browser on the PED 102, where the vendor and product information for the event may be downloaded from the event website to the PED 102.

The vendor and product information stored on the PED 102 may simply be data that is interpreted by the ordering application, or it may be specific screens, menus, images, or text that may be incorporated into the ordering application. The ordering application may be executed by the customer at the event in accordance with the vendor and product information stored on the PED 102.

Referring still to FIG. 3, the ordering application executed on the PED 102 may receive order information from a customer for products from a vendor. The ordering application may then cause the PED 102 to connect to the event server 318 via the cellular network 312, the internet 308, and communication medium 316. The event server may then parse the order request and send the necessary information, including the order, the event-specific location, and payment information to one of the vendors 320, 322, and 324 at the event. The vendor fills the order and delivers it to the event-specific location associated with the order.

As an alternative to receiving the event-specific location along with the order, the event server 318 may connect to the event admissions 302 via communication medium 326. The event server 318 may use a phone number, IP address, payment information or any other information to identify the PED 102 that placed the order. This information may then be used to search event admissions 302 for corresponding event-specific location information. For example, a customers credit card number may be used to search event admissions 302 for any seats purchased using the same credit card number.

Note that the ordering application may also be used to take orders for multiple vendors prior to sending the order information to the event server 318. This saves the customer time by only requiring the customer to fill out payment information once and having the event server 318 deliver the payment information to each of the vendors that the customer is placing an order to. Upon the event server 318 receiving the order request, it may parse the order information and send the payment information and the corresponding order information to each of the vendors identified in the order. As each of the vendors completes their order, they may deliver the products to the event-specific location identified in the order.

As an alternative to each vendor delivering their products, a centralized delivery service may be used at the event. Upon a customer placing orders to multiple vendors, the delivery service may be notified of the overall order and also notified when each of the vendors has fulfilled its order. Upon the delivery service gathering all of the ordered products, they may deliver them to the event-specific location identified in the order. In this way, a customer may receive all of the products that they ordered at the same time.

As an alternative to the PED 102 executing an ordering application, each event or each vendor may support their own executable file that may be downloaded or uploaded to the PED 102 in any of the ways described above. Upon executing the file for the specific vendor or event, an order may be placed through filling out various prompts in that program. In this case, each of the vendors 320, 322, and 324 may have a dedicated connection to the Internet 308.

Alternatively, rather than executing a framework ordering program or custom program for the event or each vendor, an event website or any number of vendor websites may be used to place orders at the various vendors at the event. An identification of the event website or a list of vendor websites may be downloaded or uploaded to be stored on the PED 102, or scanned in from the RFID tag or bar code 328 similar to the examples described above. The event website may be structured similar to what would be viewed by executing the ordering application. Namely a series of menus and prompts may be displayed to the customer such that the customer may order their desired products from one or more of the vendors. In the case of the event website, the order information gathered may be sent to the event server 318 to be parsed and delivered to each of the vendors using any of the processes described above.

In the event of a list of vendor websites, a simple list of vendors may be displayed to the customer on the PED 102. A web browser may be executed on the PED 102 in order to visit the corresponding vendor website of a vendor selected from the list. Similar to that described above, an order may be placed through filling out various prompts on the selected vendor website. In this case, the order information gathered for a vendor may be sent directly to the corresponding vendor (i.e., there may be a direct connection for each of the vendors 320, 322, and 324 to the internet). Note that the event website or vendor websites may be particularly tailored for being viewed on PEDs 102. For example, the websites may be designed to be viewed on small screens such that they may be easily navigated using the PED 102.

In any of the embodiments described above, as an alternative to placing an order for immediate delivery, a customer may pre-order products when placing an admissions order, or upon arriving at the event for delivery of products at a specified time. This may be done such that an order for products may be placed prior to the event beginning or at unimportant or non-critical times in the event, so that a customer is not distracted from the event while placing an order. Note that this may also be used in conjunction with free products, or combination packages associated with the purchase of event admissions. For example, season tickets for admissions to an event may include a sandwich and a drink for each seat wherein a customer may customize their order and specify a delivery time prior to attending each event in the season.

Also, in any of the above described embodiments, upon completing an order, the PED 102 may execute an elapsed time tracker from when the order was submitted such that a customer may know how long they have waited so far for their order. If too much time has elapsed since placing the order, the customer may use the PED 102 to inquire the status of their order. The results of the inquiry may indicate a queue number that the customers order is at, an indication that the order is in the process of delivery, an indication that the order was canceled, or any other status identifiers. In large events, in order to reduce bandwidth constraints, the order status inquiry may be restricted to be sent from any one PED 102 every fifteen minutes, for example. Note that discounts, coupons, or any other customer incentives may be given to customers on very tardy orders in order to appease the customer. Also note that an indication that an order is being delivered may automatically be sent to the PED 102 upon a vendor fulfilling an order. Upon the order being delivered, a customer survey may be sent to the PED 102 to provide feedback to the vendor about the services they have received. Again, customer incentives may be used in order to provide sufficient motivation for a customer to fill out the survey.

In addition to placing orders for products, a customer may utilize their PED 102 to request or locate various event-specific services in conjunction with the event-specific location information. One service a customer may use is to register into event lotteries or drawings for special prizes or participation in the event. For example, at some sporting events there are half-time activities that people attending the event may participate in.

Another service a customer may request is emergency services. While it is known for emergency services to utilize global positioning system (GPS) to locate emergency victims, GPS is accurate to anywhere from 6-50 feet depending on a number of variables. While this may be sufficient in some situations, in crowded environments, such as at sporting events, it may still be difficult to locate a victim in the crowd. Using the event-specific location information, such as the row and seat number, the emergency services personnel may more easily locate a victim.

Another service a customer may use at an event is a friend finder service. A customer may use an application on the PED 102 to make inquiries as to the location of friends attending the same event. This may be accomplished by a customer first registering a list of friends or other acquaintances with the event server 318. The list may be registered by the customer manually inputting a list of friends to the event server 318, or uploading a list of friends from an application on the PED 102 or other device. For example, the names of people stored in an address book on the PED 102 may be uploaded to the event server 318. Other applications may include uploading buddy lists from an instant messaging program, contact lists from e-mail or address book application, or any other list identifying friends or acquaintances.

Upon receiving the list from the PED 102, a search of event admissions 302 may be made using the information in a customers contact list. The search may be based on a friends name, e-mail address, phone number, or any other public identifier. The event server 318 may reply to the PED 102 with a list of friends identified on the contact list that are attending the event. If the customer wishes to locate one of the friends on the list returned from the event server 318, they may then send a request for the location of the selected friend. The request may be made through the event server 318 or directly to the friend's PED 102. The event server 318 may then send an inquiry to the friend's PED 102 asking whether or not they want their location information shared with the customer. If yes, then the event server 318 may obtain the location information of the friend from the friend's PED 102 or event admissions 302. Alternatively, when purchasing admission to an event a customer may register whether or not they would like to be located by other attendees. If not, then the event server 318 may not return their name on any friend inquiry lists.

Customers may also register to be placed in queues for location specific services. For example, a customer may register in a queue to meet a famous attendee. When placed on location specific queues, a message may be sent to the customer's PED 102 when it is their turn or just prior to their turn to use the location specific service. If the customer does not respond to the message or does not report to the location specific service within a predetermined amount of time then they may be removed from the queue. Similar to the case when placing orders, a timer indicating the elapsed time waiting in the queue may be used to determine the frequency of inquiries as to the status of the queue.

Customers may also use their PED 102 to check the status of location specific services. For example, a customer may inquire the status of available bathroom capacity for the closest bathroom at the event. The customer's PED 102 may inquire the event server 318 of bathroom capacities in proximity to the customer's event-specific location. Each bathroom may be equipped with a counter at the door to count the number of people entering and leaving the bathroom in order to determine its available capacity. Alternatively, for bathrooms with stalls and urinals equipped with automatic flushers, the determination by the automatic flusher of the proximity of a person may be output for each of the stalls and urinals within a bathroom to the event server 318. This will indicate the actual number of people using the facilities rather than simply the number of people in the bathroom at the time. In the case of bathroom emergencies the customer may request the location of the closest bathroom with a small or a least number of people in it. This may enable the customer to be able to use a bathroom as soon as possible.

Note that in the above examples that a map or directions from the event-specific location of a customer to a service, activity or friend may be sent to the customers PED 102 in order to assist in locating the service, activity, or friend. The map or directions may be sent from any of the event server 318, event admissions 302, downloaded from a website, or a map of the event venue may also be stored on the RFID tag 328. In the case of the map being stored on the RFID tag 328 the PED 102 may simply display the map in order to aid the customer in locating the location of the service, activity, or friend. Alternatively, the PED 102 may generate a set of directions from the event-specific location to the service, activity, or friend using the map of the event venue. The directions may be displayed on the PED 102 as a path overlaid on the map, written directions, or both.

Further, while customers may request event-specific services, the vendors themselves may also use event-specific location information of customers who have registered their PED 102 at the event. For example, vendors may send advertisements or special offers to PEDs 102 at the event. Also, it is noted that some vendors at events are portable, wherein a customer may make requests for a portable vendor to visit their area. In this way, a portable vendor may determine which area in the event venue may have the most potential sales, and therefore maximize their sales.

Figure 4:
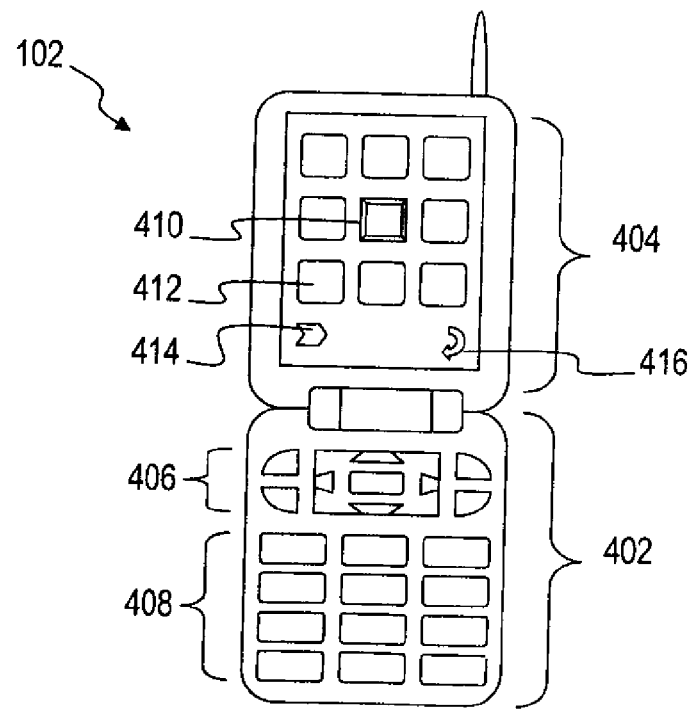
FIG. 4 shows an illustrative portable electronic device embodied as a cell phone.

FIG. 4 depicts an exemplary PED 102 that may be used in any of the embodiments described above. As shown in FIG. 4 the PED 102 includes an input section 402 and a display section 404. The input section 402 includes functional buttons 406 and a standard telephone keypad 408. The functional buttons 406 may include various display selection buttons, a directional pad with a selection button in the center, a send button, a cancel button, or any other functional buttons known to those skilled in the art. A communication unit 418 may be used for the PED 102 to communicate on various wireless networks or with various wireless devices and may include an antenna, transceiver, and any other components known to those skilled in the art. Note that any other peripheral accessories such as a bar code reader, camera, or any other peripheral device known to those skilled in the art may be integrated on or used in conjunction with the PED 102.

The display section 404 displays various menu icons 412 for executing a variety of applications on the PED 102. A currently selected menu icon may be distinguished through a highlight 410 or any other distinguishing mark. Also displayed is a first display function icon 414 corresponding to a first display functional button 406. In the example shown in FIG. 4 icon 414 may be used for navigating forward with a currently selected menu icon 410. Similarly, a second display function icon 416 is displayed corresponding to a second display selection functional button 406. In the example shown in FIG. 4, icon 416 may be used for navigating back to a previously displayed menu screen. Note that the display function icons 414 and 416 may also display text such as "Menu", "Next", "Prev", "Back", or any other appropriate text. Also note that a combination of icons and text may be used for various menu screens.

FIGS. 5-15 show illustrative graphical user interface (GUI) screens for ordering event based services or products from a PED 102 using any of the embodiments described above. Through the use of visual feedback on the GUI screens, a customer may verify their order with vendors and avoid the stress of possible miscommunication. As shown in FIG. 5, the event ordering GUI may start with a general list of event-specific categories that a customer may be interested in. In the example of FIG. 5 the list includes vendors at the event, services at the event, raffles a customer may register for, etc.

A customer may navigate the GUI through manipulating the functional buttons 406 and the keypad 408. A currently selected item is identified by a highlight 502 or any other identifying mark or indication. A customer may scroll up and down the displayed list using the page up screen function 504 by pressing the first display functional button 406, the page down screen function 506 by pressing the second display functional button 406, or the directional pad functional button 406. Upon pressing the selection in the center of the direction pad, a currently highlighted menu item is selected.

FIG. 6 depicts the resulting GUI screen upon selecting "Vendors" from the list in FIG. 5. This screen shows a further categorization of types of vendors at the event. The list shown in FIG. 6 includes food, apparel, and souvenir vendors. FIG. 7 depicts the resulting GUI screen upon selecting "Food" from the list in FIG. 6. As shown in FIG. 7, a list of the various food vendors at the event is displayed that identifies each vendor by its name and the type of food it serves.

FIG. 8 depicts the GUI screen resulting from selecting "Vendor 2" in the list depicted in FIG. 7. As shown in FIG. 8 a list of menu items is displayed to the customer. Any specials a vendor has may be located at the top of the list and the remaining menu items may be listed bellow. Alternatively, there may be an additional screen prior to that shown in FIG. 8 indicating various categories of a menu such as appetizers, sides, combo meals, drinks, etc. A customer may traverse the list and enter a quantity of each item they wish to order. In the example of FIG. 8 the customer has selected to order two "Combo 1" meals and two hot dogs. This may have been accomplished by scrolling to the desired item and using the keypad 408 to enter in the quantity desired.

A customer may customize their order by selecting the button in the center of the directional pad when the item that they want to customize is highlighted. FIG. 9 shows the GUI screen resulting from selecting the button in the center of the directional pad with the highlight located as shown in FIG. 8. As shown in FIG. 9, a list of options for customizing the customer's hot dog order is shown. A customer may scroll through the list and select/deselect any options that they may want. As shown in FIG. 9, the customer has selected to have ketchup and relish on their hot dog. FIG. 10 depicts the result of scrolling to the bottom of the list shown in FIG. 9. As shown in FIG. 10, the customer may choose to apply the selected options to an entered quantity or to apply the options to all of the quantity ordered. In this example the customer has chosen to only apply the selected options to one of the two hot dogs ordered. If the customer wanted to further customize their other hot dog they may select "More Options". By selecting "Done", the customer is indicating that no more customization of that particular type of item is desired. As such, the customer has ordered two hot dogs, one plain and one with relish and ketchup.

FIG. 11 depicts the bottom of the list shown in FIG. 8. As shown in FIG. 11, upon reaching the bottom of the vendor's menu, an option to check-out is presented to the customer. By placing this option at the bottom of the list, it requires the customer to view the entire menu before checking out. FIG. 12 depicts the resulting GUI screen upon selecting to check-out. As shown in FIG. 12 an itemized list of all of the products ordered is shown indicating the quantity ordered and the unit price for each product. While traversing the list, a customer may select any of the items ordered in order to verify customizations. FIG. 13 shows the GUI screen resulting from selecting the "Hot Dog" item. As was described above, the list shown in FIG. 13 indicates that one hot dog was ordered with ketchup and relish and the other was plain. Upon completing their review the customer may select "Done" at the bottom of the list to return to the view in FIG. 12.

Upon scrolling to the bottom of the list shown in FIG. 12 the subtotal, taxes, and total cost for the order are displayed. FIG. 14 depicts the very bottom of the list of FIG. 12 wherein a customer may select their payment option. By placing the payment options at the bottom of the list, it requires the customer to review their entire order before paying. As shown in FIG. 14 the customer may select to "Pay Cash" wherein they would pay the person delivering the order, or the customer may select to "Pay Credit" wherein the customer would pay for the order with their credit card. If the customer selects to "Pay Credit", they may go through any standard process known to those skilled in the art for entering and verifying credit card information to pay for their order. Alternatively, a credit card may be associated with the PED 102, wherein the credit card information may automatically be sent to the vendor upon selecting the "Pay Credit" option. As shown in FIG. 15, upon completion of selecting a payment option, a receipt may be sent to the PED 102 indicating their order and an estimated time for delivery to the event-specific location. While the above set of GUI screens particularly shows a process of placing a food order, it is noted that the teachings described above may be applied to placing any type of orders described above.

Figure 16:
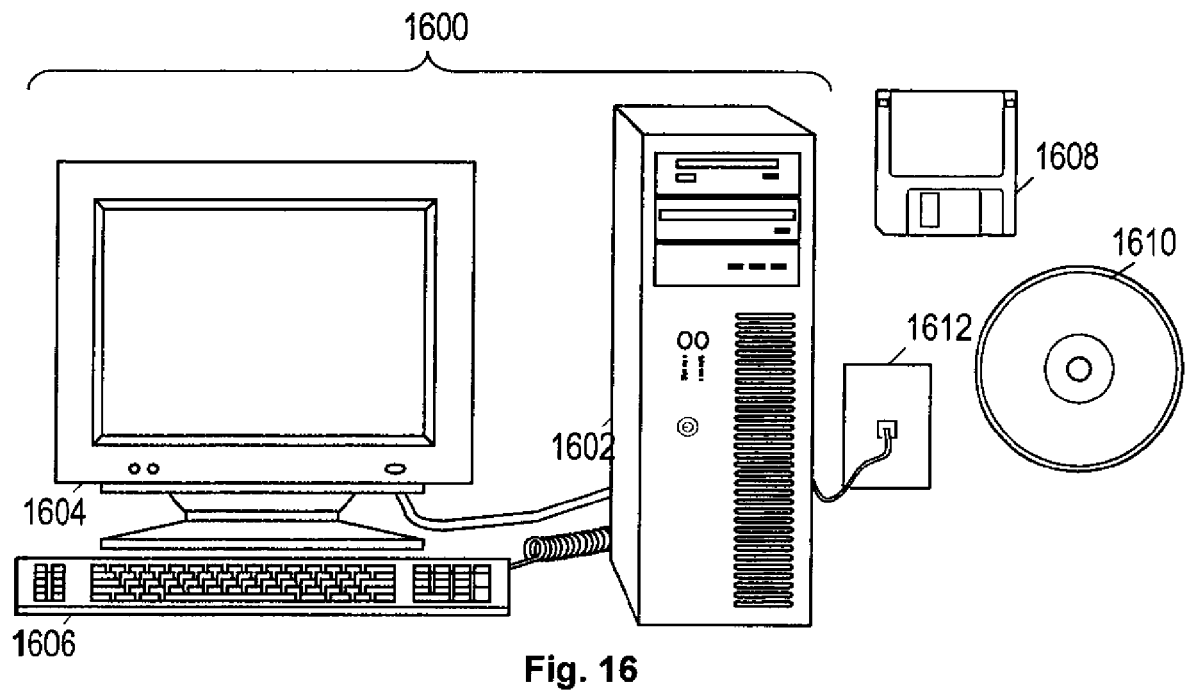
FIG. 16 shows an illustrative location integrated ordering system embodied as a desktop computer.

FIG. 16 shows an illustrative system 1600 for performing various roles in location integrated ordering, e.g., event servers 318, vendor systems 320-324, and event admissions 302. System 1600 is shown as a desktop computer 1600, although any electronic device having some amount of computing power coupled to a user interface may be configured to carry out the methods disclosed herein. Among other things, servers, portable computers, personal digital assistants (PDAs) and mobile phones may be configured to carry out aspects of the disclosed methods.

As shown, illustrative system 1600 comprises a chassis 1602, a display 1604, and an input device 1606. The chassis 1602 comprises a processor, memory, and information storage devices. One or more of the information storage devices may store programs and data on removable storage media such as a floppy disk 1608 or an optical disc 1610. The chassis 1602 may further comprise a network interface that allows the system 1600 to receive information via a wired or wireless network, represented in FIG. 16 by a phone jack 1612. The information storage media and information transport media (i.e., the networks) are collectively called "information carrier media."

The chassis 1602 is coupled to the display 1604 and the input device 1606 to interact with a user. The display 1604 and the input device 1606 may together operate as a user interface. The display 1604 is shown as a video monitor, but may take many alternative forms such as a printer, a speaker, or other means for communicating information to a user. The input device 1606 is shown as a keyboard, but may similarly take many alternative forms such as a button, a mouse, a keypad, a dial, a motion sensor, a camera, a microphone or other means for receiving information from a user. Both the display 1604 and the input device 1606 may be integrated into the chassis 1602.

Figure 17:
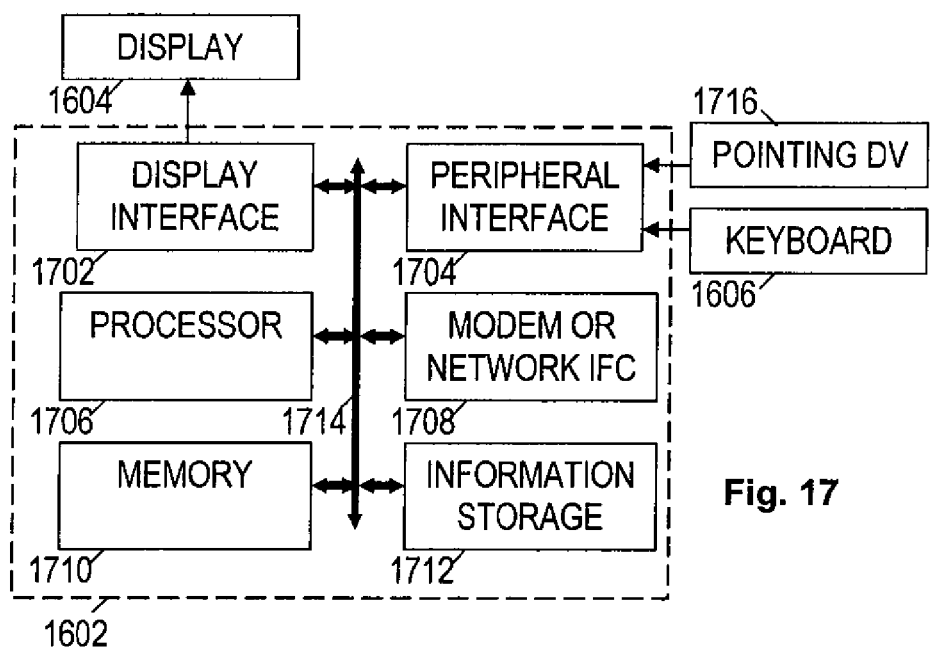
FIG. 17 shows a block diagram of an illustrative location integrated ordering system.

FIG. 17 shows a simplified functional block diagram of system 1600. The chassis 1602 may comprise a display interface 1702, a peripheral interface 1704, a processor 1706, a modem or other suitable network interface 1708, a memory 1710, an information storage device 1712, and a bus 1714. System 1600 may be a bus-based computer, with the bus 1714 interconnecting the other elements and carrying communications between them. The display interface 1702 may take the form of a video card or other suitable display interface that accepts information from the bus 1714 and transforms it into a form suitable for the display 1604. Conversely, the peripheral interface 1704 may accept signals from the keyboard 1606 and other input devices such as a pointing device 1716, and transform them into a form suitable for communication on the bus 1714.

The processor 1706 gathers information from other system elements, including input data from the peripheral interface 1704, and program instructions and other data from the memory 1710, the information storage device 1712, or from a remote location via the network interface 1708. The processor 1706 carries out the program instructions and processes the data accordingly. The program instructions may further configure the processor 1706 to send data to other system elements, comprising information for the user which may be communicated via the display interface 1702 and the display 1604.

The network interface 1708 enables the processor 1706 to communicate with remote systems via a network. The memory 1710 may serve as a low-latency temporary store of information for the processor 1706, and the information storage device 1712 may serve as a long term (but higher latency) store of information.

The processor 1706, and hence the computer 1600 as a whole, operates in accordance with one or more programs stored on the information storage device 1712. The processor 1706 may copy portions of the programs into the memory 1710 for faster access, and may switch between programs or carry out additional programs in response to user actuation of the input device. The additional programs may be retrieved from information the storage device 1712 or may be retrieved from remote locations via the network interface 1708. One or more of these programs configures system 1600 to carry out its role in at least one of the location integrated ordering methods disclosed herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components or embodiments may be combined with each other or integrated in another system or certain features may be omitted, or not implemented.

Also, techniques, systems, subsystems and methods described and illustrated in the various embodiments as discrete or separate may be combined with each other or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for placing an order for products, services, or activities at an event, comprising:
    receiving, by an event server, the order for products, services, or activities offered by a plurality of vendors at the event from a portable electronic device associated with a customer;
    receiving, by the event server, event-specific location information of the portable electronic device;
    parsing, by the event server, the order into portions of the order corresponding to each of a plurality of vendors at the event;
    placing, by the event server, the order to the plurality of vendors specified in the order using the event-specific location information by communicating the portions of the order to each of the corresponding vendors; sending, by the event server, a result of the order to the portable electronic device;
    receiving, by the event server, a first request from the portable electronic device that the customer be placed in a queue for a first location-specific service;
    adding, by the event server, the customer to the queue for the first location-specific service;
    receiving, by the event server, a second request from the portable electronic device requesting a status of a second location-specific service; and
    sending, by the event server, the status of the second location-specific service to the portable electronic device.

2. The method of claim 1, wherein:
    the result of the order is one or more selected from a group consisting of: a receipt of the order, an indication of delivery of the order; a customer survey to provide feedback concerning the order, an indication that the order is being delivered, an indication that the order was canceled, an indication of being placed on a queue for the service or activity, an indication of being registered for an event lottery, and an indication of a location of a friend.

3. The method of claim 2, further comprising:
    sending directions and/or a map indicating a path to travel from the event-specific location to any of the service, activity, or friend.

4. The method of claim 2, further comprising:
    automatically sending an indication of being at or near the front of the queue.

5. The method of claim 1, further comprising:
    sending, by the event server, payment information to all of the vendors specified in the order.

6. The method of claim 1, wherein:
    the event-specific location information is received by the event server by the personal electronic device locally obtaining the event-specific location information through reading a bar code or a near field communication device, through correlating a longitude and latitude with the event-specific location, or by receiving the event-specific information from event admissions.

7. The method of claim 1, further comprising:
    requesting a product and/or a service prior to an event for delivery at a specified time during the event.

8. The method of claim 1, wherein the first location-specific service comprises meeting a famous attendee at an event, and wherein the status of the second location-specific service comprises available bathroom capacity for a bathroom at the event.

9. A portable electronic device for placing orders for products, services, or activities at an event, comprising:
    a communication unit that, when implemented by the portable electronic device, communicates with one or more event units to obtain event-specific location information and vendor ordering information, and to send an order;
    a memory comprising an ordering application, the event-specific location information, and the vendor ordering information; and
    a processor configured to execute the ordering application in conjunction with the vendor ordering information such that execution of the ordering application causes the portable electronic device to place the order that includes the event-specific location information and specifies products, services, and/or activities offered by the plurality of vendors, request a customer be placed in a queue for a location-specific service, and request and receive a status of a location-specific service, using the communication unit.

10. The portable electronic device of claim 9, wherein:
the ordering application is any of a web browser, an ordering application, an event-specific ordering application, a location-specific ordering application, or a vendor specific ordering application.

11. The portable electronic device of claim 10, wherein:
the vendor ordering information includes any of a web site, a list of web sites, screens, menus, images, text, or an executable file.

12. The portable electronic device of claim 9, wherein:
one of the one or more event units includes any of a bar code or a near field communication device at the event-specific location that stores the event-specific location information and the vendor ordering information.

13. The portable electronic device of claim 9, wherein:
one of the one or more event units includes an event server for receiving and parsing the order for delivery to each of the corresponding vendors identified in the order.

14. The portable electronic device of claim 9, further comprising:
an elapsed time tracker, wherein the elapsed time tracker indicates an amount of time that has elapsed since the order was submitted.

15. A non-transitory computer readable medium containing instructions that, when placed in operable relation to a portable electronic device associated with a customer, cause the portable electronic device to:
request event-specific location information and vendor ordering information;
execute an ordering application in accordance with the vendor ordering information;
send, by the ordering application, an order for products, services, or activities offered by a plurality of vendors at an event, wherein the order includes the event-specific location information;
receive, by the ordering application, an indication of receipt of the order;
send, by the ordering application, a request to register the customer for a first location-specific service;
send, by the ordering application, an inquiry of a status of a second location-specific service; and
receive, by the ordering application, the status of the second location-specific service.

16. The non-transitory computer readable medium of claim 15, wherein:
the indication of receipt includes one or more of a list of the products ordered, a cost of the order, and an estimated time for delivery to the event-specific location specified in the order.

17. The non-transitory computer readable medium of claim 15, wherein:
the indication of receipt includes any of an indication of a status of the service, an indication of registration on a queue for the service or activity, an indication of registration for an event lottery, or an indication of a location of a friend.

18. The non-transitory computer readable medium of claim 17, further comprising instructions that cause the portable electronic device to:
receive directions from the event-specific location to the activity, service, or friend.

19. The non-transitory computer readable medium of claim 15, wherein:
the ordering application is any of a web browser, an event-specific ordering application, or a vendor specific ordering application.

20. The portable electronic device of claim 9, further comprising one of a bar code reader, an RFID tag reader, and a near-field communication device.

* * * * *